United States Patent [19]

Lütze et al.

[11] Patent Number: 5,056,816
[45] Date of Patent: Oct. 15, 1991

[54] HEAD RESTRAINT FOR REAR SEATS

[75] Inventors: Hans Lütze, Aidlingen; Günther Ast, Horb; Ulrich Gerber, Wildberg, all of Fed. Rep. of Germany

[73] Assignee: Daimler-Benz AG, Fed. Rep. of Germany

[21] Appl. No.: 550,089

[22] Filed: Jul. 9, 1990

[30] Foreign Application Priority Data

Jul. 8, 1989 [DE] Fed. Rep. of Germany ....... 3922509

[51] Int. Cl.⁵ .............................................. B60R 21/13
[52] U.S. Cl. ..................... 280/751; 280/753; 280/756
[58] Field of Search ....................... 280/751, 753, 756; 296/180.5; 297/403, 395

[56] References Cited

U.S. PATENT DOCUMENTS 3,292,726 12/1966 Jette ...................................... 280/753
4,015,875 4/1977 Setina ................... 296/24.1
4,822,102 4/1989 Duvenkamp ........................ 297/403
4,840,398 6/1989 Matthias et al. .................... 280/756

FOREIGN PATENT DOCUMENTS 2166310 8/1973 Fed. Rep. of Germany .

Primary Examiner—Kenneth R. Rice
Assistant Examiner—M. Shaughnessy
Attorney, Agent, or Firm—Evenson, Wands, Edwards, Lenahan & McKeown

[57] ABSTRACT

A head restraint for rear seats of convertibles is attached to a U-shaped roll-over bar and can be displaced with the roll-over bar. The roll-over bar can be raised from a lowered position into a support position and spans to a large extent the width of the interior of the vehicle. The lateral legs of the roll-over bar are equally curved along a rear wall of the rear seat rest with a center of curvature on the seat side of the rear seat rest.

8 Claims, 1 Drawing Sheet

HEAD RESTRAINT FOR REAR SEATS

BACKGROUND AND SUMMARY OF THE INVENTION

The present invention relates to head restraints for vehicles, and more specifically, to an arrangement for head restraints for rear seats of convertible vehicles having a head restraint attached to, and displaceable with, a U-shaped roll-over bar that can be raised from a lowered position to a support position.

A head restraint for vehicle seats is described in the as yet unpublished German Patent Document DE-A 3,822,461, this head restaint being attached to a U-shaped roll-over bar that can be displaced in height in guides fixed to the vehicle. Each vehicle seat is assigned a roll-over bar which is supported behind the seat on the vehicle floor. Support of a height-adjustable head restraint via a roll-over bar on the vehicle floor is exceptionally stable and is, in principle, simple to provide. This combination of a head restraint with a roll-over bar has, however, the disadvantage that the roll-over bar behind the seat rest uses up a lot of space in the footwell since the head restraint must join the seat rest close to the upper end of the seat rest. The consequent spatial distance of the roll-over bar from the seat close to the floor of the vehicle may even result in there being no room at all for such a roll-over bar to be attached in this region. Alternatively, this could also result in the space for installing further bodywork parts or units being adversely affected.

An object of the present invention is to combine a head restraint of a conventional type with a roll-over bar so as to provide safety in an accident, and thereby use up as little structural space in the motor vehicle as possible.

This and other objects are met by the present invention which provides an arrangement for providing head restraint for rear seats in a convertible vehicle, comprising a U-shaped roll-over bar and an attached head restraint. The roll-over bar is operable to be raised from a lowered position to a support position. The roll-over bar spans a width of the interior of the vehicle, and has lateral legs that stand behind a rear seat rest, these lateral legs being curved equally such that their center of curvature lies on a seat side of the rear seat rest. The head restraint is attached to and displaceable with the roll-over bar.

As a result of its spanning the width of the interior of the vehicle, the legs of the roll-over bar can be attached close to or on the lateral frame rails on the bodywork floor. A stable support is thereby achieved without this attachment requiring additional reinforcements. The legs of the roll-over bar extend along the rear side of the rear seat, bent equally with a center of curvature on the seat side. The roll-over bar thereby takes up only a minimum amount of installation space behind the rear-seat rest while still allowing a raising movement into the support position.

As a result of this arrangement of the roll-over bar, the head restraint can also be integrated into the interior of the vehicle in a particularly elegant manner. This is because the head restraint, together with the roll-over bar, can be lowered, at its furthest extent, to a point beneath a visible upper rim of the lateral bodywork walls such that the head restraint is not visible in the lowered condition. When the roll-over bar is raised, it adjoins a rear-seat rest without any gap, and supports the head of a passenger of any size.

Other objects, advantages and novel features of the present invention will become apparent from the following detailed description of the invention when considered in conjunction with the accompanying drawings.

DETAILED DESCRIPTION OF THE DRAWINGS

Figure 1:
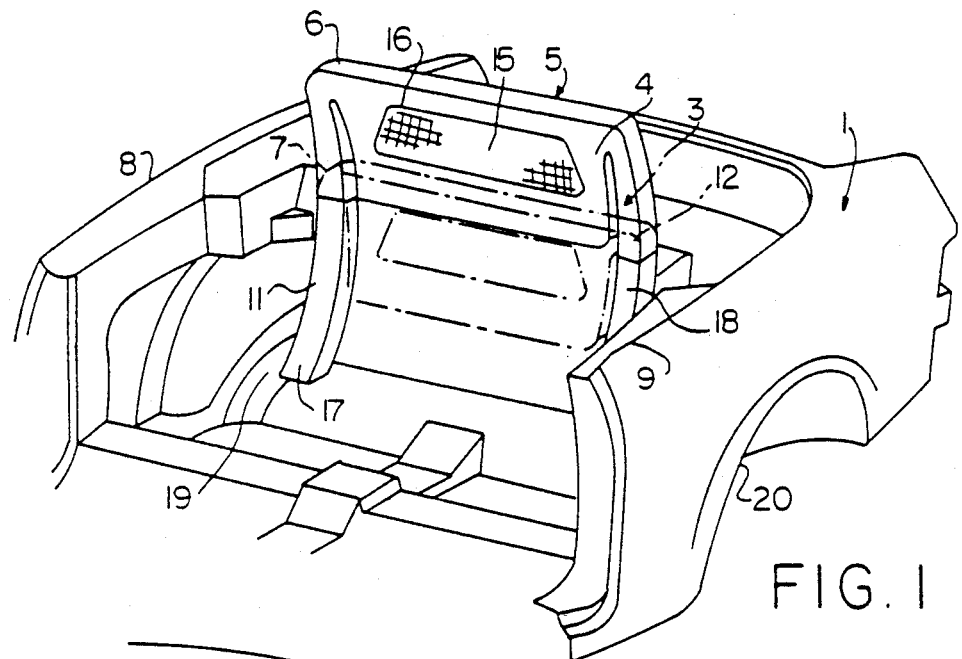
FIG. 1 shows the tail part of a body of a convertible, with a raised head restraint in solid lines, and a lowered head restraint shown in dot-dash lines.

In FIG. 1, the tail part of a body 1 of a convertible is shown, in which a U-shaped roll-over bar 3 is situated behind an installation space for a rear seat 2 (not shown in FIG. 1). A head-restraint padding 4 of a head restraint 5, which can be displaced in height with the roll-over bar 3, is foamed around the upper part of the roll-over bar 3. The head restraint 5 and the roll-over bar 3 are shown in solid lines in FIG. 1 in a raised support position 6 of the roll-over bar 3. A lowered state 7 of the head restraint 5 and the roll-over bar 3 is indicated by a dot-dash line. In this lowered state, the head restraint 5 lies for the most part beneath a visible upper rim of a lateral bodywork wall 8 and 9, and the contour of the vehicle bodywork 1 is therefore not visibly adversely affected when viewed from the outside.

Figure 2:
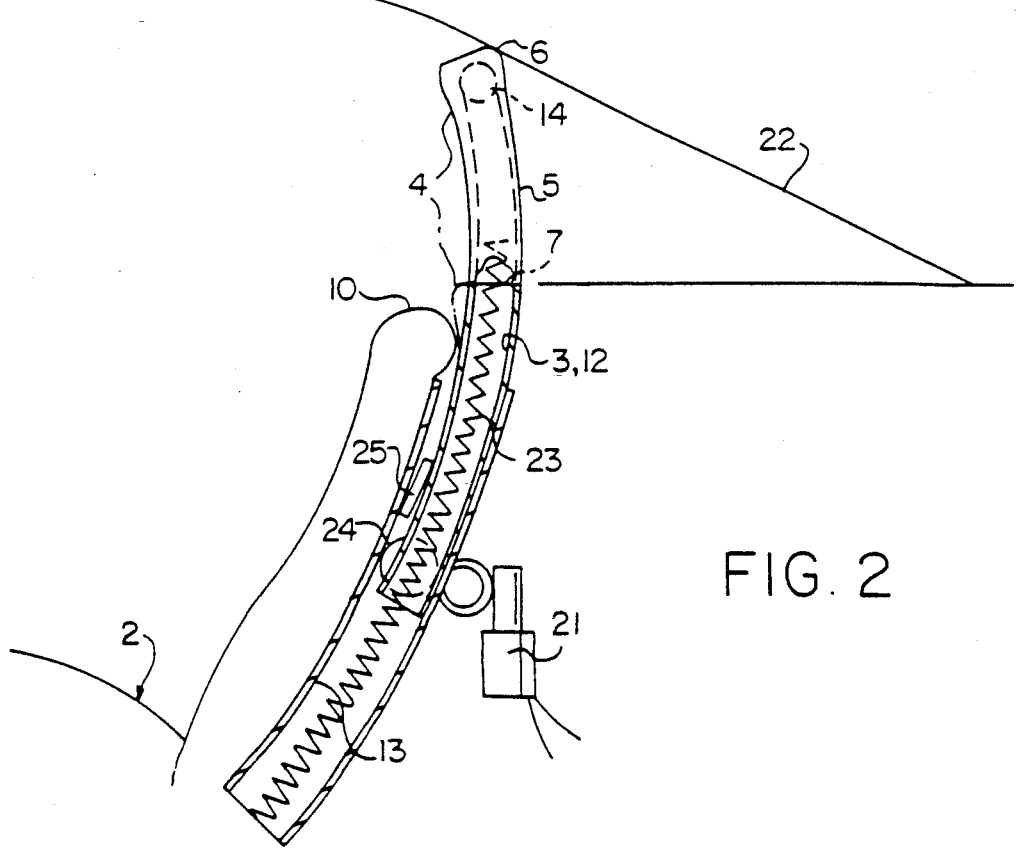
FIG. 2 shows, in side view, a longitudinal section in the region of a leg of a roll-over bar installed in the rear of a vehicle.

As it is intended for the head restraint 5 to extend the rear seat 2 in terms of height close to a rear seat rest 10 and so that an excessive amount of structural space behind the rear seat 2 is not blocked by the height-adjustable roll-over bar 3 supporting the head restraint, lateral legs 11 and 12 of the roll-over bar 3, as shown in FIG. 2 for a leg 12, are designed curved equally along a rear wall 13 of the rear seat rest such that the center of curvature lies on the seat side of the rear seat rest. In the support position 6 of the roll-over bar 3, the head restraint 5 furthermore adjoins the rear seat rest 10 without any gap so that the support of the head of a passenger of any size sitting on the rear seat 2 is guaranteed by the head restraint 5, and in an emergency by the rear seat rest 10.

An advantage provided by this combination of head restraint 5 and roll-over bar 3 results from the possibility of the headrestraint padding 4 being foamed around a central bar part 14 and, where appropriate, also surrounding the roll-over bar 3 in one piece along its extension over the width of the vehicle.

For reasons of vision, the head-restraint padding 4 is provided in the central region with a clear opening 15 which, in order to prevent a draft, is filled in by a fabric 16 or alternatively by a transparent film. The roll-over bar 3, which securely supports the head restraint 5, to a large extent spans the width of the interior of the vehicle bodywork 1, and thus in a protective manner the passengers sitting on the rear seat 2. The roll-over bar 3 can therefore additionally be attached, via its guide tubes 17 and 18, each accommodating a leg 11 and 12 respectively, to a lateral frame rail 19 and respectively, on the vehicle floor and, where necessary, to lateral walls 8 and 9 of the bodywork. Additional reinforcements for the secure support of the roll-over bar 3 in the vehicle are then no longer needed.

The roll-over bar 3 remains displaceable in height with its equally concavely arched legs 11 and 12 in its similarly arched guide tubes 17 and 18. The displacement is effected by an adjustable drive 21 engaging with the roll-over bar 3. The drive 21 has not been illustrated in detail in FIGS. 1 and 2, but can be realized in a known manner, e.g. by a toothed gear which acts on a toothed rack on the roll-over bar 3. For the rapid extending movement of the roll-over bar into the support position 6, which reaches as far as the contour of a top 22 (FIG. 2), a conventional rapid drive is provided by a pressure spring 23.

For an easy displacement movement of the legs 11 and 12 in their respective guide tubes 17 and 18, two rollers 24 and 25 are mounted on each leg 11 and 12 and are oriented with their axes of rotation approximately perpendicular to one another. The rollers 24, 25 can support the legs 11 and 12 of the roll-over bar 3 in all directions of stress against the walls of the guide tubes 17 and 18, which are square in cross-section.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An arrangement of a headrest for rear seats in a convertible vehicle, comprising:

a U-shaped roll-over bar that is operable to be raised from a lowered position behind the rear seat to a support position above the rear seat in the direction of the roof, said roll-over bar largely spanning the width of the interior of the vehicle, said roll-over bar having lateral legs which uniformly extend in a curved manner such that the center of curvature lies on the seat side;

guide tubes fixed to the vehicle behind the rear seat, in which said lateral legs are displaced;

a pressure spring coupled to the roll-over bar that displaces the roll-over bar rapidly;

an additional controllable drive that displaces the roll-over bar slowly; and a headrest attached to and displaceable with the roll-over bar.

2. The arrangement of claim 1, wherein the vehicle has lateral bodywork walls with a visible upper rim, and wherein the headrest lies substantially beneath said visible upper rim when the roll-over bar is in said lowered position.

3. The arrangement of claim 1, wherein the headrest abuts the rear seat when the roll-over bar is in said support position.

4. The arrangement according to claim 1, wherein the headrest includes head restraint padding foamed around the roll-over bar.

5. The arrangement according to claim 1, wherein the headrest surrounds the roll-over bar along an extension of the roll-over bar over the width of the vehicle.

6. The arrangement of claim 5, wherein the headrest has a central region with an opening that is filled by a transparent material.

7. The arrangement of claim 1, wherein the guide tubes are bent guide tubes supported on at least one of lateral frame rails on a floor of the vehicle or lateral bodywork walls of the vehicle, each bent guide tube accommodating one leg of the roll-over bar.

8. The arrangement of claim 7, further comprising rollers mounted on said legs to support said legs in substantially all directions of stress against walls of the bent guide tubes.

* * * * *